United States Patent
Lenth et al.

(10) Patent No.: US 8,316,901 B1
(45) Date of Patent: Nov. 27, 2012

(54) CUTTER ATTACHMENT AND METHOD OF USING

(75) Inventors: Josh Lenth, Manchester, IA (US); Jay Koester, Manchester, IA (US)

(73) Assignee: Paladin Brands Group, Inc., Cedar Rapids, IA (US)

( * ) Notice: Subject to any disclaimer, the term of this patent is extended or adjusted under 35 U.S.C. 154(b) by 94 days.

(21) Appl. No.: 12/701,838

(22) Filed: Feb. 8, 2010

Related U.S. Application Data

(60) Provisional application No. 61/150,648, filed on Feb. 6, 2009.

(51) Int. Cl.
*A01G 23/06* (2006.01)

(52) U.S. Cl. .............. 144/24.12; 144/24.13; 144/334; 241/101.72

(58) Field of Classification Search .......... 144/24.12, 144/24.13, 334; 37/302; 241/101.71, 101.72, 241/101.74
See application file for complete search history.

(56) References Cited

U.S. PATENT DOCUMENTS

| | | | |
|---|---|---|---|
| 4,121,777 A * | 10/1978 | Kolstad et al. ................... | 241/58 |
| 4,260,114 A | 4/1981 | Herder | |
| 4,848,423 A | 7/1989 | Yoder | |
| 5,158,126 A | 10/1992 | Lang | |
| 5,355,918 A * | 10/1994 | Lang ........................... | 144/24.12 |
| 5,431,350 A * | 7/1995 | Purser ....................... | 241/101.72 |
| 5,555,652 A | 9/1996 | Ashby | |
| 5,641,129 A * | 6/1997 | Esposito et al. .......... | 241/101.74 |
| 5,743,315 A | 4/1998 | Esposito et al. | |
| 6,848,244 B2 | 2/2005 | Northcutt | |
| 7,748,421 B2 * | 7/2010 | Everett .......................... | 144/172 |

OTHER PUBLICATIONS

Screen shot from GyroTrac's website (http://www.gyrotrac.net/videos.php) showing pictures and videos of mulching attachment devices (the date of this reference is not known, but this reference was known to Applicant prior to Applicant's effective filing date), known prior to Feb. 6, 2009.

Screen shot from Fecon's website (http://www.fecon.com/mediaroom/action-videos.asp) showing pictures and videos of mulching attachment devices (the date of this reference is not known, but this reference was known to Applicant prior to Applicant's effective filing date), known prior to Feb. 6, 2009.

Screen shot from Coastal Earth & Treeworx's website (http://www.coastaltreeworx.com.au) showing pictures and videos of mulching attachment devices (the date of this reference is not known, but this reference was known to Applicant prior to Applicant's effective filing date), known prior to Feb. 6, 2009.

Screen shot from Skid Steer Solutions' website (http://www.skidsteersolutions.com/ProductDetails.asp?ProductCode=STMP%2D220L%2DMINI) showing pictures and videos of mulching attachment devices (the date of this reference is not known, but this reference was known to Applicant prior to Applicant's effective filing date), known prior to Feb. 6, 2009.

\* cited by examiner

*Primary Examiner* — Bena Miller
(74) *Attorney, Agent, or Firm* — Ryan N. Carter

(57) ABSTRACT

A device and method for cutting and mulching material such as trees, bushes, roots, stumps, vegetation, and other debris. The device includes a frame adapted to be combined with a prime mover vehicle. The frame supports a rotating cutting element having a plurality of rotating cutters. The cutting element is actuated by a motor to spin at a speed and with a force suitable for cutting trees and other material. The frame further includes a supporting surface that helps to support the material and guide it toward the cutting element as the device is moved downward to cut and mulch the material.

13 Claims, 3 Drawing Sheets

CUTTER ATTACHMENT AND METHOD OF USING

This application is based upon U.S. Provisional Application Ser. No. 61/150,648 filed on Feb. 6, 2009, the complete disclosure of which is hereby expressly incorporated by this reference.

BACKGROUND

Attachment devices having rotating cutters are used to cut, chip, and mulch material such as trees, bushes, roots, stumps, vegetation, and other debris. These types of devices are often combined with prime mover vehicles such as excavators or skid steer loaders. In operation, these devices are typically combined with the boom of a prime mover vehicle allowing them to reach upwards to remove the lighter tops from standing tees and then grind the remaining tree trunk down to the ground. Examples of these types of cutter devices are found in U.S. Pat. Nos. 5,743,315 (Esposito et. al.) and 5,555,652 (Ashby).

One problem associated with these types of devices is that it can be difficult to control and maintain consistent contact with the materials being cut (e.g. trees) as their trunks are being cut and mulched due to the forceful impact of the rotating cutting elements and the springiness of the tree trunk. As illustrated in FIG. 2, with existing devices, the tree trunk shakes and vibrates violently as the rotating cutting elements successively contact the tree trunk. This occurs because the cutting elements momentarily displace the tree trunk from its normal upright position as it is struck. Then, the tree trunk springs back to its normal position in-between strikes from the cutting elements. The result is often excessive oscillation, vibration, plunge or sporadic cutting and deflection of the tree trunk away from the cutter making it difficult to mulch the standing tree trunk to the ground. This condition is amplified by the distance that the cutting assembly is lifted or extended out and away from the prime mover.

SUMMARY

This invention comprises a device and method for cutting and mulching material such as trees, bushes, roots, stumps, vegetation, and other debris. The device includes a frame adapted to be combined with a prime mover vehicle such as the boom of an excavator or the arms of a skid steer loader. The frame supports a rotating cutting element having a plurality of cutters that are used to engage and cut the material. The cutting element is actuated by a power source such as an electric, hydraulic, or gasoline motor which is operatively combined with the cutting element to spin the cutting element at a speed and with a force suitable for cutting, grinding, and mulching trees and other material.

The frame includes a supporting surface that helps to support the material and guide it toward the cutter device as the device is moved downward to cut and mulch the material. In use, when the device is lowered onto material such as a standing tree trunk, the cutting teeth contact the tree trunk and push it toward the supporting surface thereby securing it between the rotating cutting element and the supporting surface. With the tree trunk captured between the supporting surface and the rotating cutting element, the machine operator is able to smoothly lower the device down the tree trunk maintaining consistent contact between the cutting element and the tree trunk. The consistent contact will result in smoother control of the boom allowing the operator to run the device at peak performance without stalling. Smoother motion also reduces the amount of stress induced on the excavator boom.

DETAILED DESCRIPTION

Figure 1:
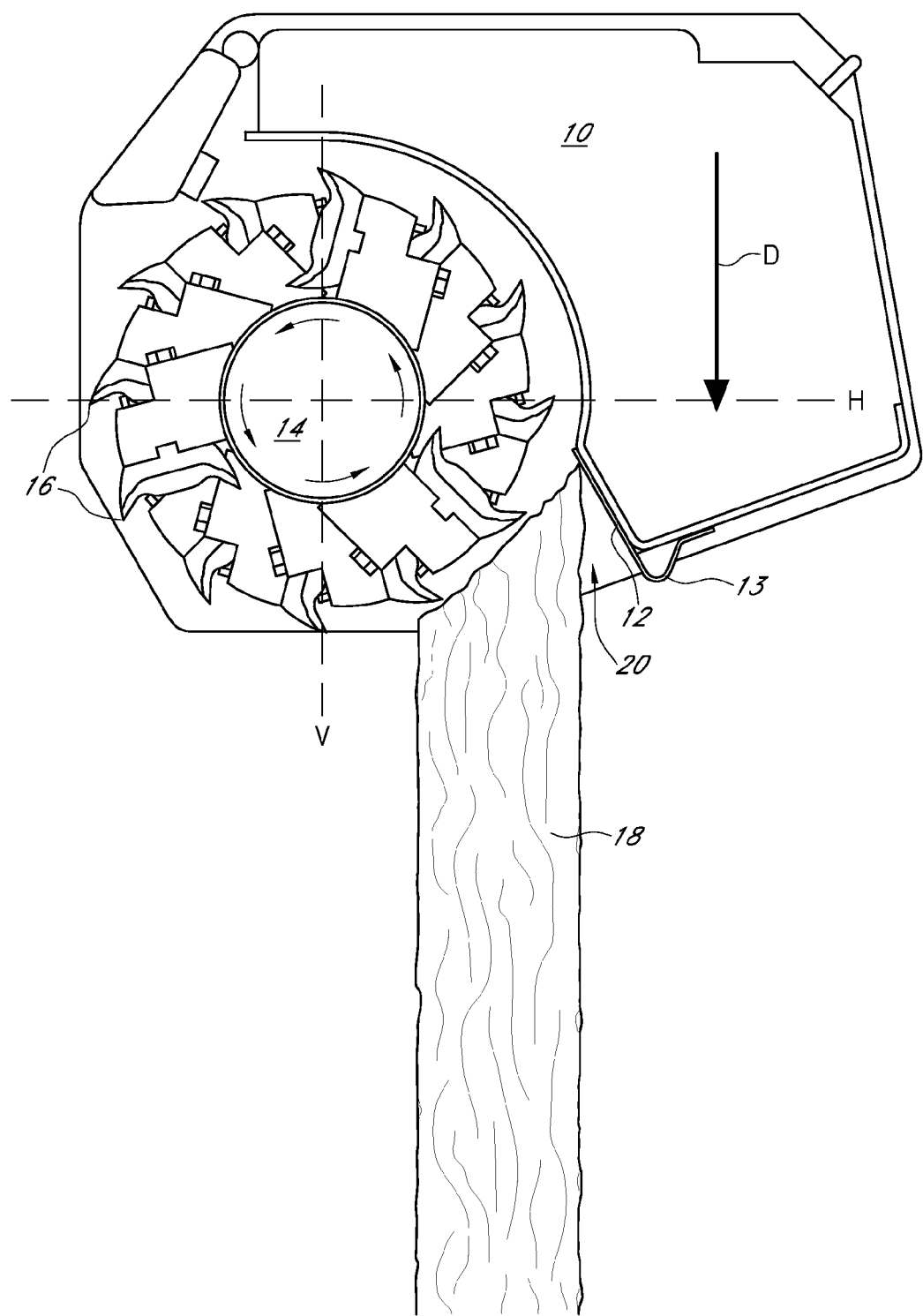
FIG. 1 is a side view of the cutter device.
Figure 2:
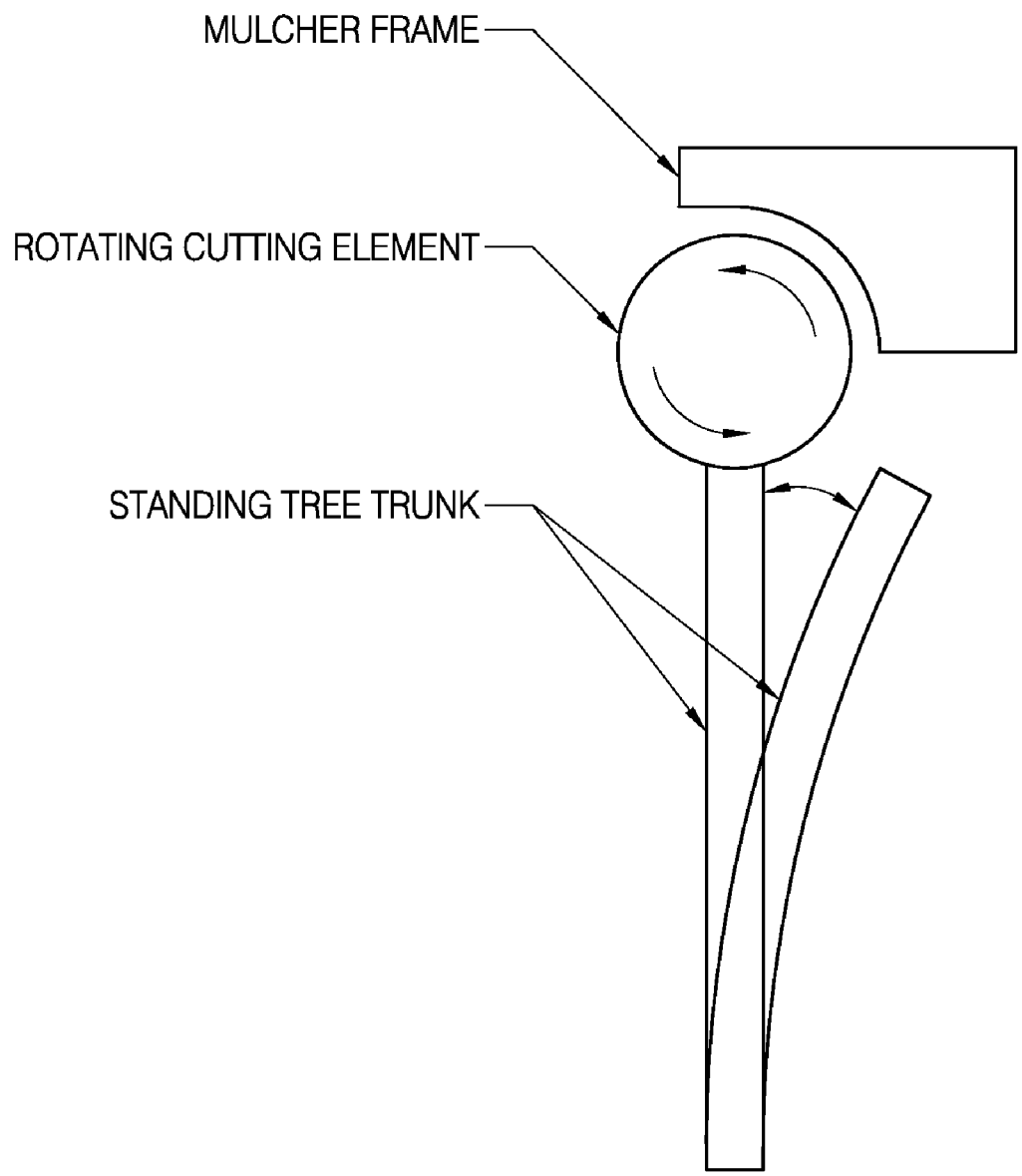
FIG. 2 is a side view of a prior art cutter device.
Figure 3:
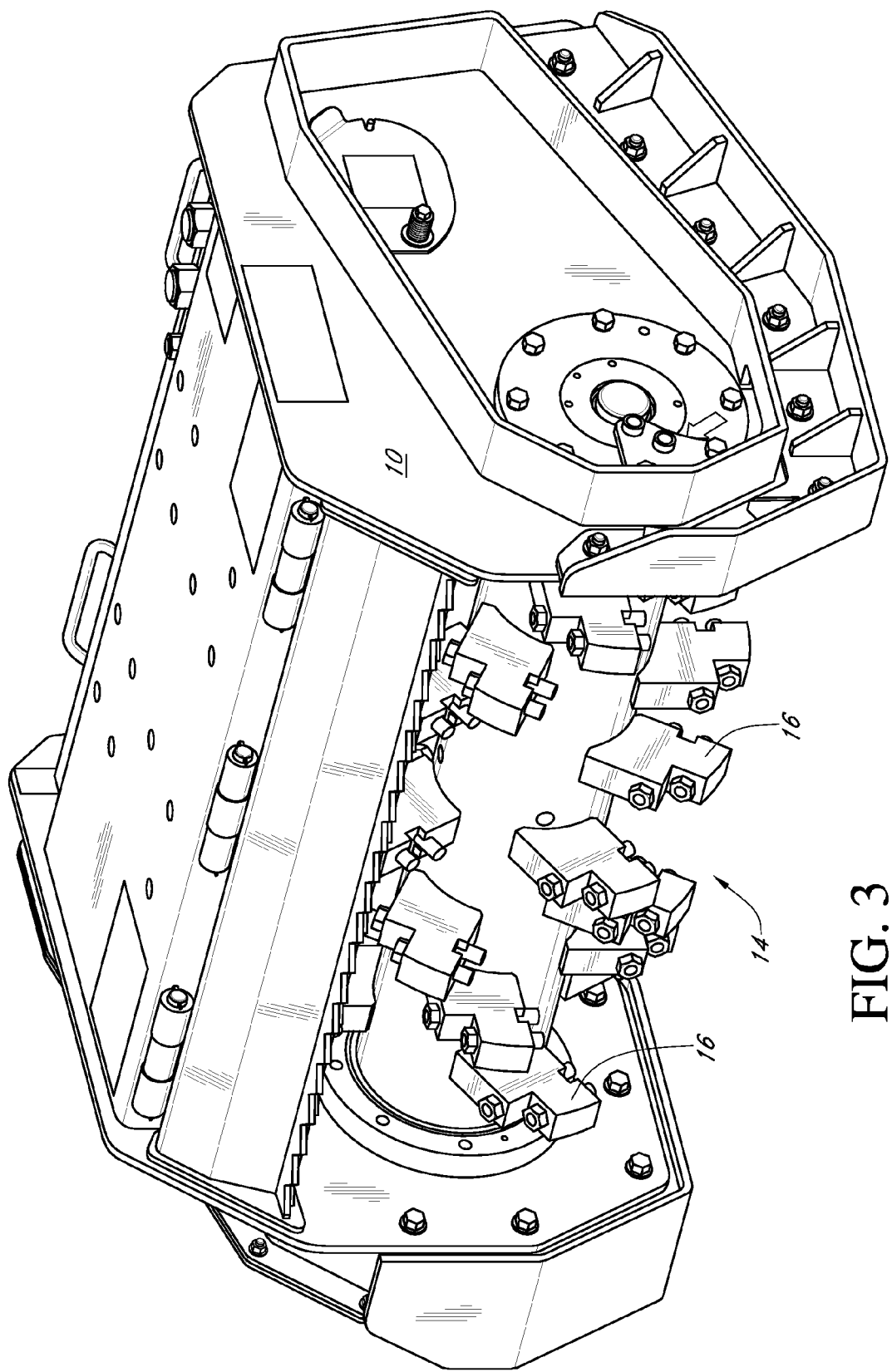
FIG. 3 is a perspective view of the cutter device.

This invention comprises a device and method for cutting and mulching material such as trees, bushes, roots, stumps, vegetation, and other debris. Although a tree trunk 18 is used throughout this specification as an exemplary type of material, the device may be used to cut any suitable material. As shown in FIGS. 1 and 3, the device includes a frame 10 adapted to be combined with a prime mover vehicle such as the boom of an excavator or the arms of a skid steer loader. The frame 10 supports a rotating cutting element 14 extending generally the length of the frame 10. As shown in FIG. 1, a horizontal plane H and a vertical plane V are perpendicular to each other and intersect at the cutting element's 14 rotational axis. The horizontal and vertical nature of these planes H, V is relative to the device and not relative to the ground. In other words, as the operator causes the position of the device to change relative to the ground, the horizontal H and vertical V planes shown on FIG. 1 change with the device. In the embodiment shown in FIG. 3, the rotating cutting element 14 is a cylindrical shaft or drum having a plurality of cutters 16 extending therefrom. The cutting element 14 rotates in a direction that causes material to be pushed toward the supporting surface 12, as described below in more detail. The cutting element 14 is actuated by an electric, hydraulic, or gasoline powered motor to spin at a speed and with a force suitable for grinding and mulching trees and other material. In one embodiment, the motor is powered by the prime mover vehicle, such as the hydraulic system of the prime mover vehicle.

The frame 10 further includes a supporting surface 12 that helps to support the material (e.g. tree trunk 18) and guide it toward the cutting element 14 as the device is forced downward to cut and mulch the material. A pocket 20 is created between the cutting element 14 and the supporting surface 12. The pocket 20 is a space suitable for receiving a portion of the material to be cut. In one embodiment, at least a portion of the supporting surface 12 extends below the horizontal plane H. In an alternate embodiment shown in FIG. 1, the entire supporting surface 12 is located below horizontal plane H. The supporting surface 12 may be a wall of the frame 10 or it may be a separate component that is combined with the frame 10. Although the supporting surface 12 may be slanted toward the cutting element 14 as described below, the supporting surface 12 is preferably a generally flat surface (without curvature).

In the embodiment shown in FIG. 1, the supporting surface 12 is angled toward the cutting element 14 thereby creating a pocket 20 that is larger toward the bottom of the device for initially capturing a tree trunk 18 (or other material) then narrowing to guide the tree trunk 18 toward the cutting element 14. The angle of the supporting surface 12 is such that materials captured in the pocket 20 will be forced into the cutting element 14 by the supporting surface 12 as the device is moved downward along the material. This embodiment also allows for a greater tolerance with respect to the size of the tree trunk 18 being cut. It also requires less precision by the operator since the angled supporting surface 12 guides trees of a variety of sizes toward the cutting element 14 as long as the tree is captured somewhere in the pocket 20. In one embodiment, the supporting surface 12 is slanted at an angle between five and eighty-five degrees.

In the embodiment shown in FIG. 1, the supporting surface 12 includes a protrusion 13 that extends below the lower surface of the frame 10 to increase the size of the pocket 20 without requiring other walls of the frame 10 to be longer. The increased pocket size created by the protrusion 13 helps initially capture a tree trunk 18 (or other material) and guide it toward the cutting element 14.

In use, the device is used to grind/cut the upper portion of a tree trunk 18 with the rotating cutting element 14. Then, the apparatus is pushed against the tree trunk 18 at a point above the ground until the upper portion of the tree trunk 18 breaks off. As indicated by direction arrow D in FIG. 1, the device is then lowered onto the portion of the tree trunk 18 that remains standing wherein the rotating cutters 16 contact the tree trunk 18 and push it towards the supporting surface 12 (into the pocket 20) which supports the tree trunk 18 and guides it into the cutting element 14 as the device is moved downward and the tree trunk 18 is shredded. With the tree trunk 18 captured between the supporting surface 12 and the rotating cutting element 14, the machine operator will be able to smoothly lower the device down the tree trunk 18 maintaining consistent contact between the cutting element 14 and the tree trunk 18.

Having thus described the invention in connection with the preferred embodiments thereof, it will be evident to those skilled in the art that various revisions can be made to the preferred embodiments described herein with out departing from the spirit and scope of the invention. It is my intention, however, that all such revisions and modifications that are evident to those skilled in the art will be included with in the scope of the following claims.

What is claimed is as follows:

1. An attachment device for cutting material wherein said attachment device is adapted to be combined with a prime mover vehicle, said device comprising:
    a frame having a first end, a second end, an upper surface, and a lower surface;
    a cutting element rotationally combined with the frame and extending from the frame first end to the frame second end, said cutting element having a plurality of cutters that rotate around an axis of rotation in a first direction to cut material;
    a horizontal plane extending through the axis of rotation;
    a supporting surface combined with the frame at an angle between forty-five and eighty-five degrees relative to the horizontal plane for supporting the material as the material is being cut and guiding the material toward the cutting element;
    a pocket extending from the frame first end to the frame second end, said pocket for receiving a portion of the material to be cut, wherein the pocket is defined by the cutting element on one side and the supporting surface on another side;
    wherein the entire supporting surface is located below the horizontal plane.

2. The attachment device of claim 1 wherein the supporting surface is a portion of the frame.

3. The attachment device of claim 1 wherein the supporting surface has a protrusion that extends below the lower surface of the frame to increase the size of the pocket.

4. The attachment device of claim 1 wherein the supporting surface is angled toward the cutting element thereby making the pocket narrower as the pocket gets closer to the cutting element to direct the material toward the cutting element during use.

5. The device of claim 1 wherein cutting element is a cylindrical drum.

6. An attachment device for cutting material wherein said attachment device is adapted to be combined with a prime mover vehicle, said device comprising:
    a frame having a first end, a second end, an upper surface, and a lower surface;
    a cutting element rotationally combined with the frame and extending from the frame first end to the frame second end, said cutting element having a plurality of cutters that rotate around a horizontal axis of rotation;
    a horizontal plane extending through the axis of rotation; a flat supporting surface combined with the frame at an angle between forty-five and eighty-five degrees relative to the horizontal plane, said supporting surface extending below the horizontal plane, said supporting surface for supporting the material as the material is being cut and guiding the material toward the cutting element;
    a pocket extending from the frame first end to the frame second end, said pocket for receiving a portion of the material to be cut, wherein the pocket is defined by the cutting element on one side and the supporting surface on another side;
    wherein the angle of the supporting surface makes the pocket narrower as the pocket gets closer to the cutting element to direct the material toward the cutting element during use;
    wherein the entire supporting surface is located below the horizontal axis of rotation.

7. The attachment device of claim 6 wherein the supporting surface is a portion of the frame.

8. The device of claim 6 wherein the cutting element is a cylindrical drum.

9. The device of claim 6 wherein the prime mover vehicle is an excavator having a boom and the frame is combined with the boom.

10. An attachment device for cutting material wherein said attachment device is adapted to be combined with a prime mover vehicle, said device comprising:
    a frame having a first end, a second end, an upper surface, and a lower surface;
    a cutting element rotationally combined with the frame and extending from the frame first end to the frame second end, said cutting element having a plurality of cutters that rotate around a horizontal axis of rotation;
    a horizontal plane extending through the axis of rotation;
    a supporting surface combined with the frame at an angle between forty-five and eighty-five degrees relative to the horizontal plane, said supporting surface located entirely below the horizontal plane to create a pocket extending from the frame first end to the frame second end between the cutting element and the supporting surface, said supporting surface for supporting the material as the material is being cut;
    wherein the angle of the supporting surface makes the pocket narrower as the pocket gets closer to the cutting element to guide the material toward the cutting element during use;
    wherein the supporting surface has a protrusion that extends below the lower surface of the frame to increase the size of the pocket.

11. The attachment device of claim 10 wherein the supporting surface is a portion of the frame.

12. The device of claim 10 wherein the cutting element is a cylindrical drum.

13. The device of claim 10 wherein the cutting element is actuated by a hydraulic motor.

* * * * *